US005497454A

United States Patent [19]
Bates et al.

[11] Patent Number: 5,497,454
[45] Date of Patent: Mar. 5, 1996

[54] SYSTEM FOR PRESENTING ALTERNATE VIEWS OF A COMPUTER WINDOW ENVIRONMENT

[75] Inventors: Cary L. Bates, Rochester; Jeffrey M. Ryan, Byron, both of Minn.

[73] Assignee: International Business Machines Corporation, Armonk, N.Y.

[21] Appl. No.: 333,252

[22] Filed: Nov. 2, 1994

[51] Int. Cl.⁶ ........................................................ G06F 3/14
[52] U.S. Cl. ............................................. 395/158; 395/157
[58] Field of Search ........................... 395/157, 158, 395/159, 155; 345/120, 119

[56] References Cited

U.S. PATENT DOCUMENTS

| | | | |
|---|---|---|---|
| 4,806,919 | 2/1989 | Nakayama et al. | 340/721 |
| 4,890,257 | 12/1989 | Anthias et al. | 364/900 |
| 5,101,365 | 3/1992 | Westberg et al. | 395/158 |
| 5,129,055 | 7/1992 | Yamazaki et al. | 395/158 |
| 5,191,644 | 3/1993 | Takeda | 395/158 |
| 5,233,687 | 8/1993 | Henderson, Jr. et al. | 395/158 |
| 5,241,656 | 8/1993 | Loucks et al. | 395/158 |
| 5,265,202 | 11/1993 | Krueger et al. | 395/158 |
| 5,270,806 | 12/1993 | Venable et al. | 395/500 |
| 5,305,435 | 4/1994 | Bronson | 395/159 |
| 5,309,555 | 5/1994 | Akins et al. | 395/157 |
| 5,371,844 | 12/1994 | Andrew et al. | 395/155 |
| 5,394,521 | 2/1995 | Henderson, Jr. et al. | 395/158 |
| 5,448,695 | 9/1995 | Douglas et al. | 395/155 |

*Primary Examiner*—Raymond J. Bayerl
*Assistant Examiner*—Ruay Lian Ho
*Attorney, Agent, or Firm*—Merchant, Gould, Smith, Edell, Welter & Schmidt

[57] ABSTRACT

A system for presenting an alternate view of computer windows on a display device. Upon selection by a user, the system presents the alternate view, which may include a top, side, or bottom view of the windows. These alternate views are indicators, such as title bars, corresponding to the windows and presented in relative position to another as if the user were looking at the tops, sides, or bottoms of the windows. The user may also manipulate the windows in the alternate view, and the system alters a normal view of the windows accordingly.

23 Claims, 9 Drawing Sheets

SYSTEM FOR PRESENTING ALTERNATE VIEWS OF A COMPUTER WINDOW ENVIRONMENT

FIELD OF THE INVENTION

The present invention relates to a system for presenting a top, side, or bottom view of computer windows and for further allowing a user to manipulate the computer windows in this alternate view.

BACKGROUND OF THE INVENTION

Computer programs are often represented by windows on a display device. Each of these windows typically represents a program operating on the computer which may be selected by a user through the window. These computer windows often overlap one another, and a user may have several windows open at any given time. When many windows are open and overlapping on the display, it may be difficult for a user to find a particular window. This is especially true when some windows are completely hidden behind other windows.

Some systems exist for presenting alternate views of the windows. These include tiling and listing operations. For example, in a listing operation, a system may provide a list of the application programs and corresponding windows open on the display device. Therefore, a user may at least have a list of all windows which are currently open. In a tiling operation, the computer may manipulate all windows so that they are not overlapping and thus, for example, appear as "tiles" adjacent to one another.

A user, however, sometimes cannot manipulate the windows within these alternate views. This means that a user must find a window in the alternate view and then switch back to the normal view in order to manipulate the corresponding window. Also, in presenting these "tiles," the computer usually imposes a different order on the windows, which means that the windows typically do not appear at the same positions on the display device in comparison to the normal view. Therefore, the listing and tiling operations do not necessarily provide an indication of where the corresponding window is located on a display device and thus do not assist a user in locating a position of a particular window.

SUMMARY OF THE INVENTION

The present invention provides an easy method and system for locating and manipulating computer windows. The system provides an alternate view of the computer windows which may comprise a top view, side view, or bottom view of the windows. In the alternate view, each of the windows is represented by an indicator, and these indicators are displayed in a manner that shows how the windows are positioned to one another. When a user manipulates an indicator, the system responds by altering the position of the corresponding window to match the manipulation of the indicator.

DETAILED DESCRIPTION OF THE PREFERRED EMBODIMENTS

Overview

The present invention provides for easy and efficient location and management of computer windows. A system operating on a computer presents the windows in an alternate view upon selection by a user. This alternate view is preferably a top view, and may also be a side or bottom view. In the top view, indicators corresponding to the windows are presented as if the user were looking down on the tops of the windows. In the side view, the indicators are presented as if a user were looking at the right or left sides of the windows. In the bottom view, the indicators are presented as if a user were looking up at the bottoms of the windows. The indicators thus show the relative positions of the windows to one another and provide for an easy way of locating particular windows on the display. The alternate view may replace the normal view on the display or be presented in another window on the display such as along with a normal view of the windows.

The user may manipulate the windows in the alternate view. For example, the user may move the windows or select particular windows in the top view, and the windows will be altered accordingly in the normal view. This provides an efficient way of allowing the user to locate and manipulate windows. Instead of having to return to the normal view to manipulate windows located in an alternate view, the present invention allows the user to both easily locate and manipulate the windows in the alternate view. The user thus need not switch between the alternate and normal views to locate and manipulate windows.

Upon selection by a user, the system stores position and size information of the windows for the normal view. The system then processes the position and size information to assemble and present corresponding indicators for the alternate view. The system also sets a flag to indicate which view is presented. When a user "turns off" the alternate view, the system uses the stored position and size information to re-assemble and present the windows in the normal view.

Display of Alternate Views

Figure 1:
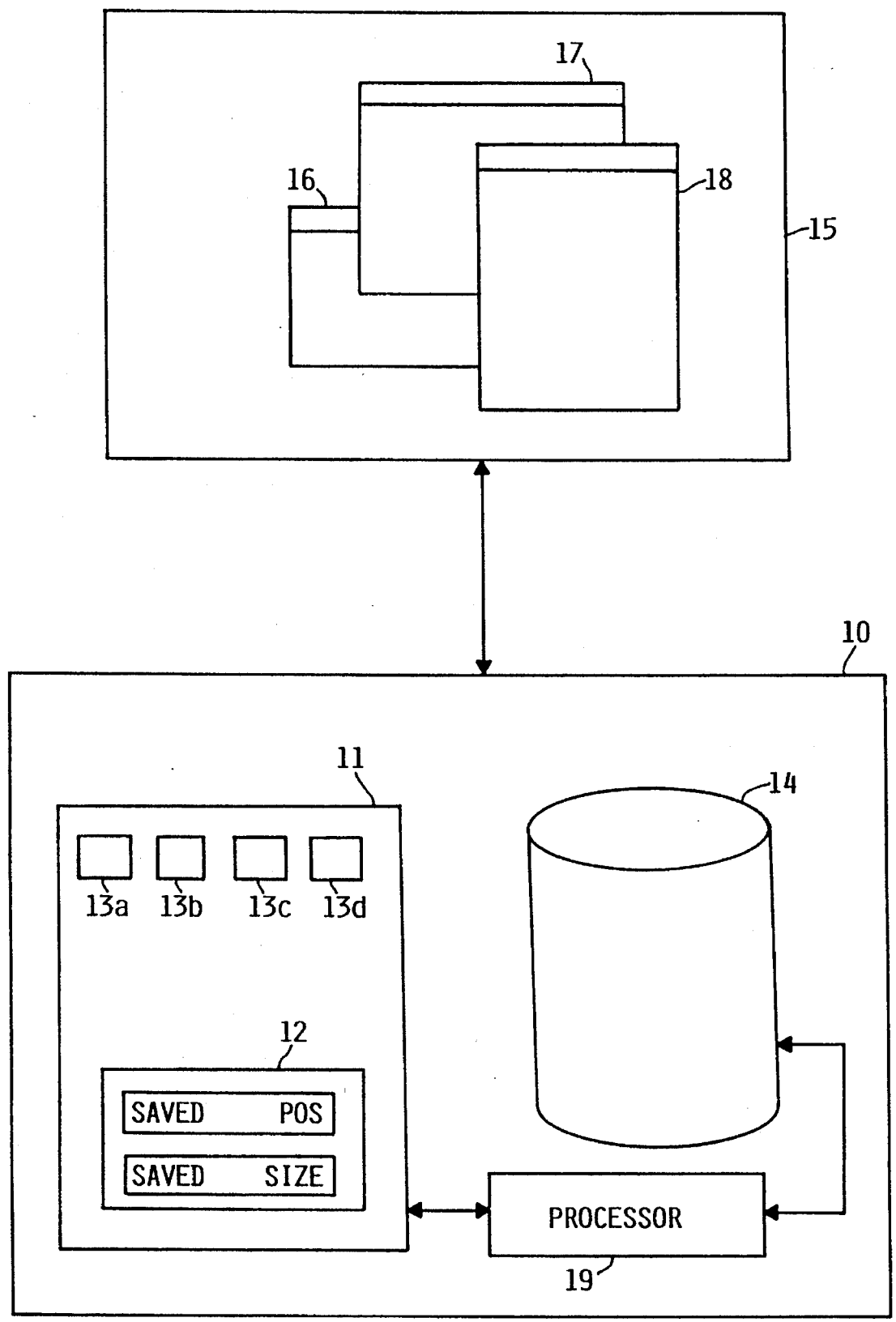
FIG. 1 is a block diagram of a system interacting with a display device for presenting an alternate view of windows on the display device.

FIG. 1 is a block diagram of a computer 10 interfaced with a display device 15. The computer 10 includes a processor 19 and a user-controlled input device such as a mouse, trackball, keyboard, or other input device (not shown) for controlling the presentation of windows on the display device 15. These windows may include, for example, windows 16, 17, and 18 shown on the display device 15. Computer 10 preferably includes a random access memory 11 with a window handle 12 for storing position and size information of the windows. The memory 11 also preferably includes flags for indicating whether or not the windows are shown in an alternate view, such as top view flag 13*a*, right side view flag 13*b*, left side view flag 13*c*, and bottom view flag 13*d*. The computer 10 also may include a hard disk drive 14 for storing data such as programs to be executed by the processor 19 in the computer 10.

Figure 2:
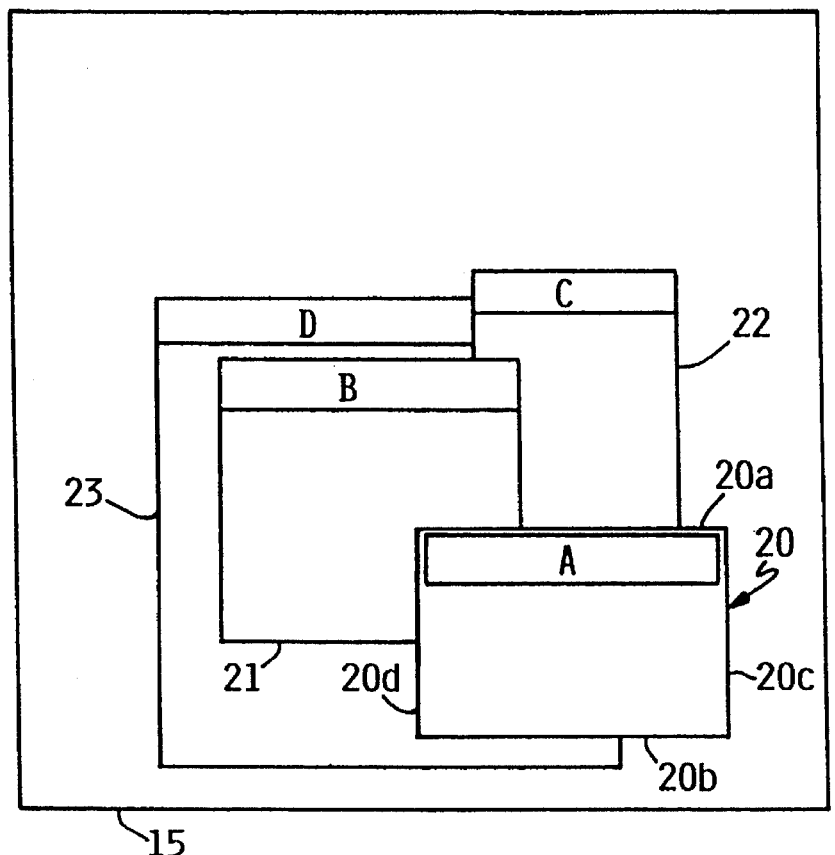
FIG. 2 is a diagram of a display device presenting windows in a normal view.

FIG. 2 is a diagram of the display device 15 presenting windows in a normal view. These windows include, for example, windows 20-23. Each of the windows 20-23 typically has a top, sides, and bottom, which are also referred to as "edges." For example, window 20 has a top 20*a*, right side 20*c*, left side 20*d*, and bottom 20*b*. Rectangular computer windows are only one example of such windows. Other shapes for presenting windows are possible. The letters "A" through "D" represent the titles or title bars of the corresponding windows 20-23.

Each of the windows 20-23 typically represents a program operating on the computer. A user may interact with the program via the corresponding windows 20-23. As shown in FIG. 2, the window 20 has "focus" which means that it is currently selected by a user and represents the currently active program. A window is typically shown with "focus" by highlighting its borders (top, sides, and bottom). Other methods of showing "focus" of a window are possible, such as highlighting only a portion of the window, highlighting the title, or altering the appearance of background of the window.

Figure 3:
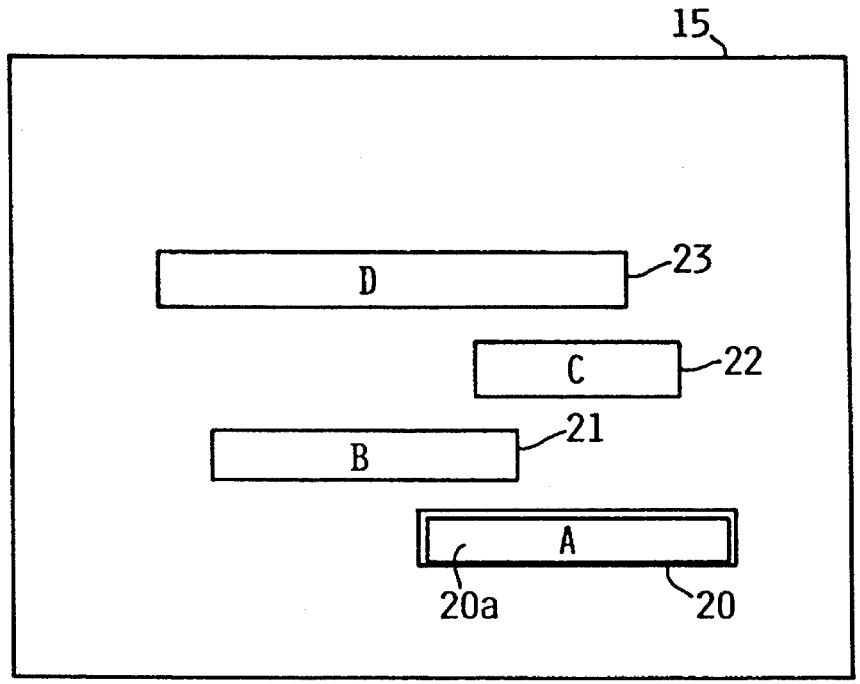
FIG. 3 is a diagram of a display device presenting windows in a top view.

FIG. 3 is a diagram of display device 15 presenting the windows 20-23 in a preferred alternate view, which comprises a top view. In this top view, the computer 10 displays the windows 20-23 on the display device 15 as if the user were looking down on the tops of the windows, such as top 20*a* of window 20. The windows 20-23 are thus shown in relative position to one another. For example, window 21 is behind window 20 and in front of window 22 in the normal view. In the top view, window 21 is shown as being above window 20 and below window 22. In the top view, the computer 10 preferably displays the titles of the corresponding windows as representative indicators of the windows. The computer 10 also typically shows which window has "focus" by, for example, highlighting the borders of the corresponding indicator in the top view, such the indicator for the window 20. These indicators are typically shown as non-overlapping so that a user may easily and quickly locate a particular window. Other types of indicators are possible for representing the windows in the alternate view.

Figure 4:
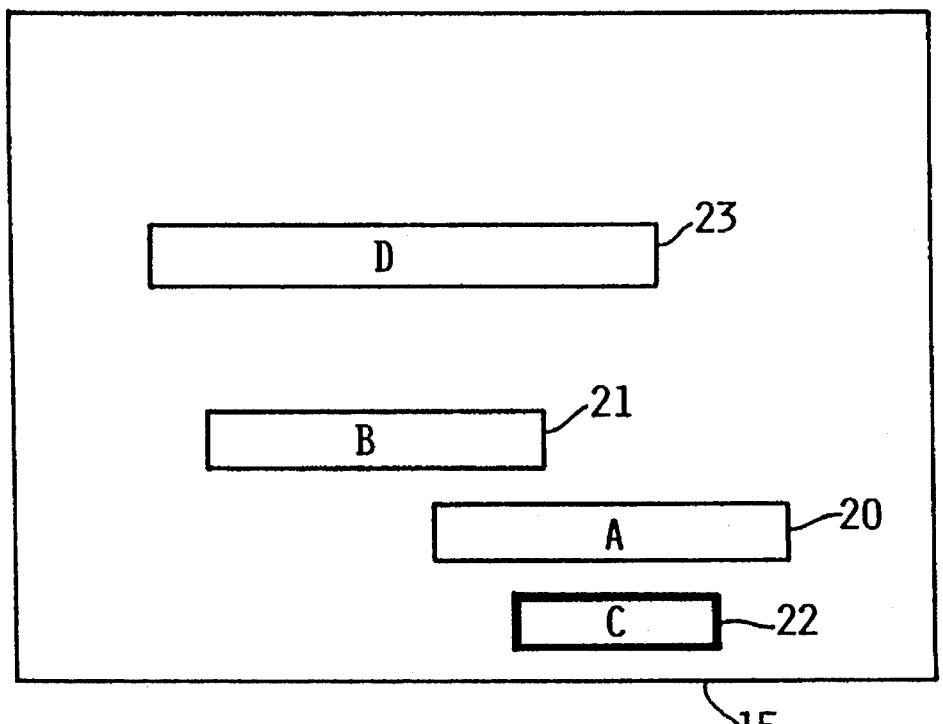
FIG. 4 is a diagram of a display device presenting windows in a top view and showing the results of a user's manipulation of a particular window in the top view.

FIG. 4 is a diagram showing an example of the user's manipulation of the windows in the top view. The user has moved the indicator for the window 22 to the front of the displayed windows, which is accomplished in the top view by moving window 22 so that it is below all other indicators. In moving window 22 to the front, the user's selection of window 22 has changed window 22 to the currently active window, and it is thus shown as having "focus" in FIG. 4.

Figure 5:
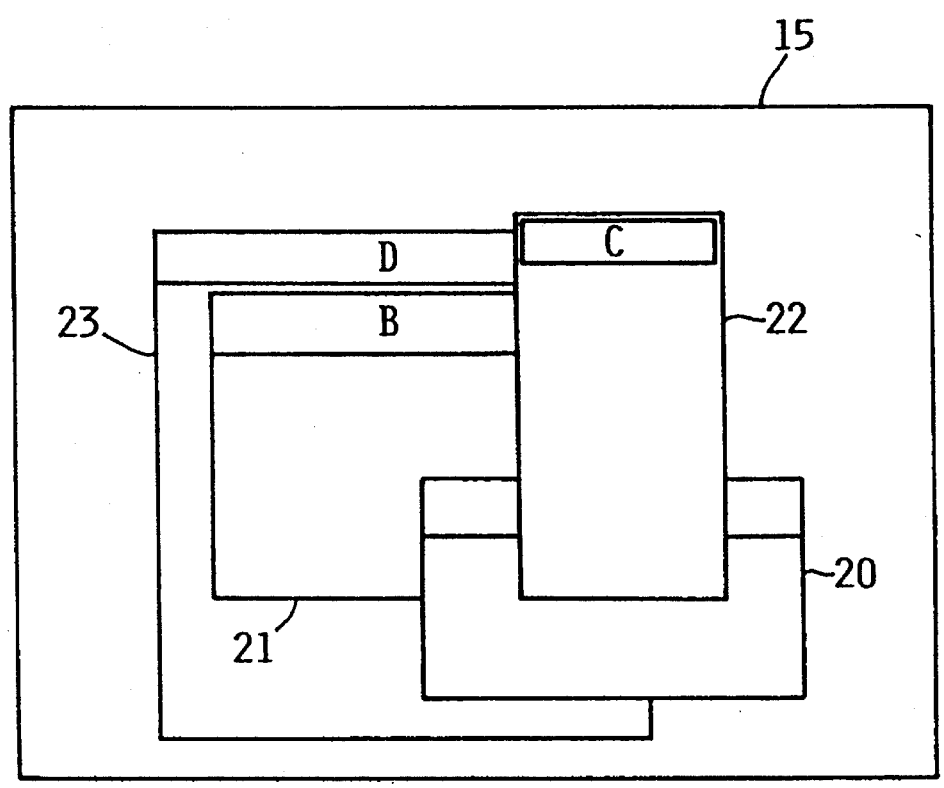
FIG. 5 is a diagram of a display device presenting the windows in a normal view and as altered by the user's manipulation of the windows in a top view shown in FIG. 4.

FIG. 5 shows the windows 20-23 in a normal view and altered as determined by the user's manipulation of the windows in the top view. Accordingly, window 22 is now shown as having the focus and in front of the windows 20, 21, and 23.

Figure 6:
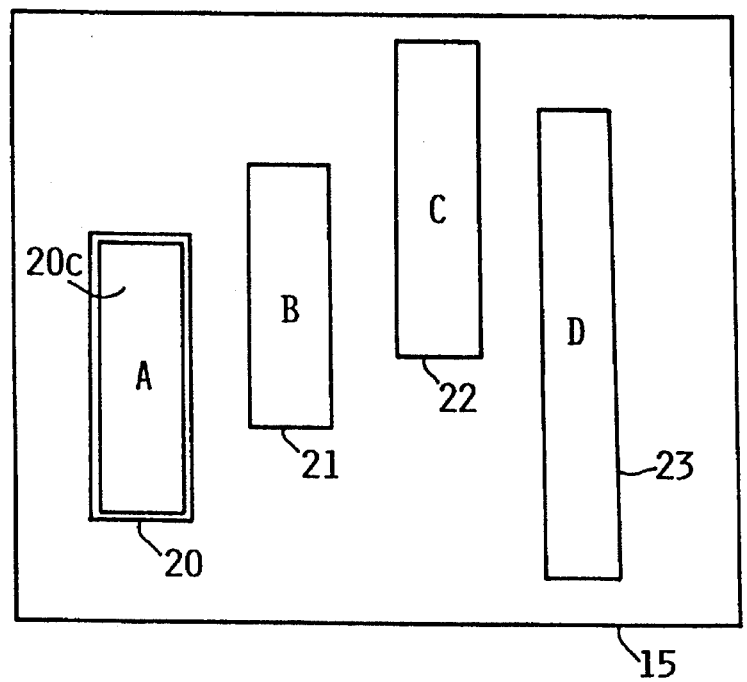
FIG. 6 is a diagram of a display device presenting windows in a right side view.
Figure 7:
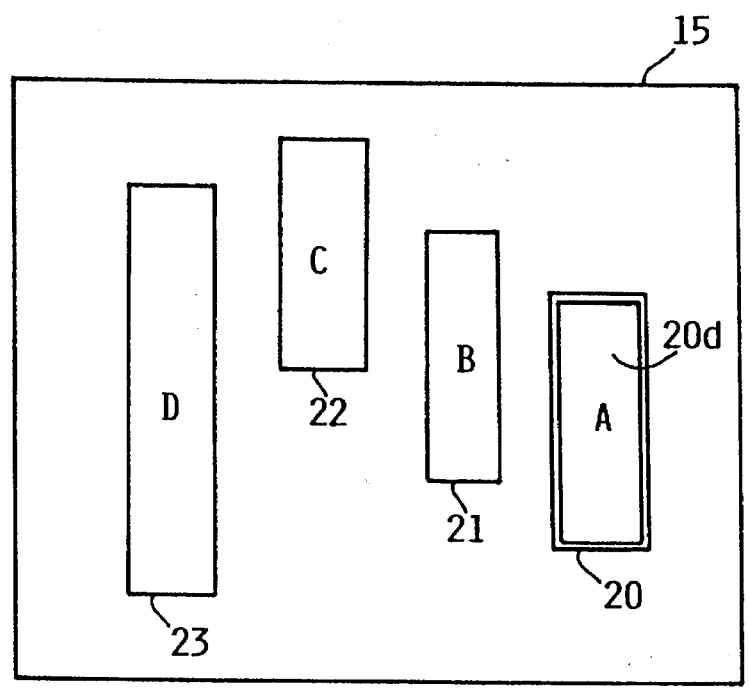
FIG. 7 is a diagram of a display device presenting windows in a left side view.

FIGS. 6–7 show additional alternate views, which may include a right side view, a left side view, and a bottom view. In each of these alternate views, the windows 20-23 are preferably displayed by indicators which may comprise the titles of the corresponding windows, as explained above.

Figure 8:
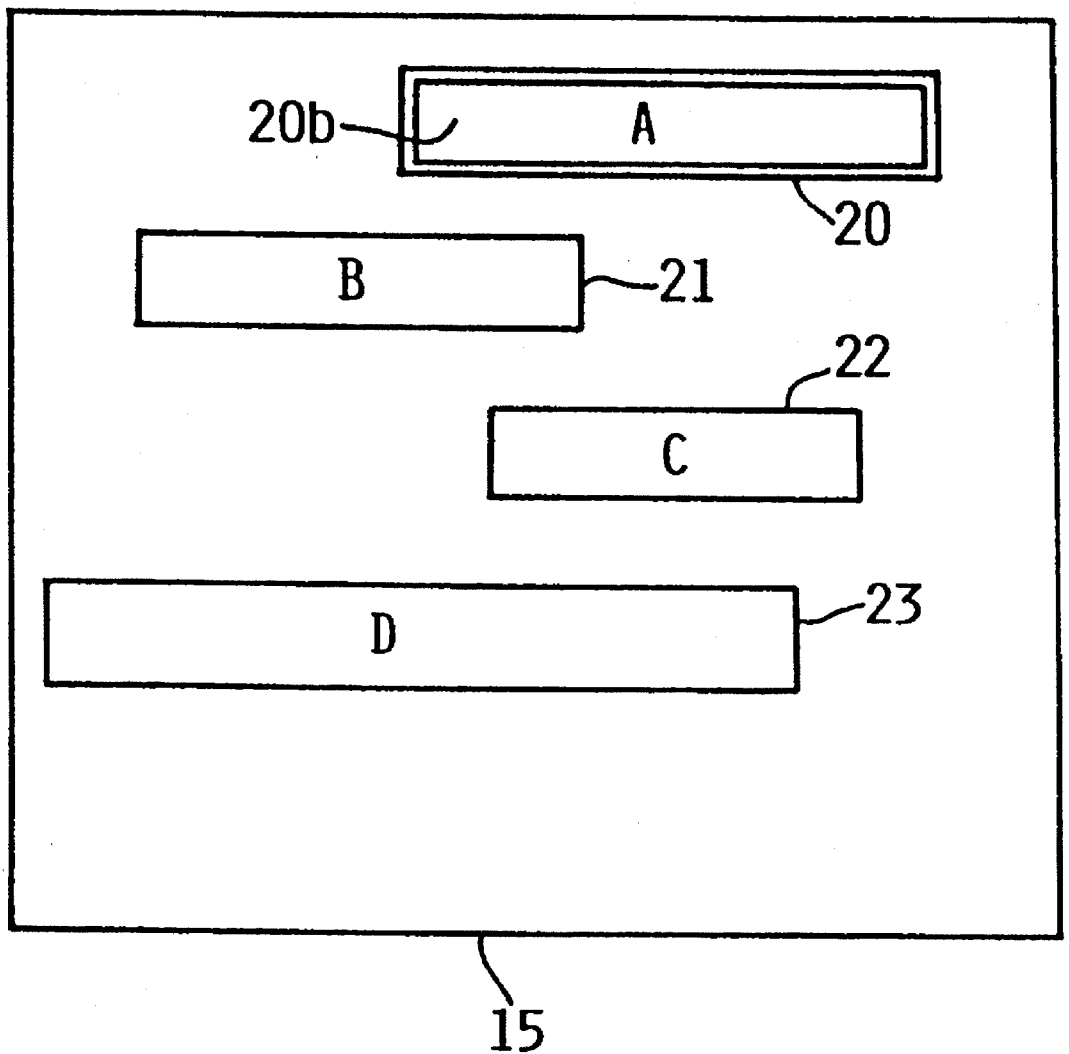
FIG. 8 is a diagram of a display device presenting windows in a bottom view.

In the right side view of FIG. 6, the computer 10 displays the windows 20-23 on the display device 15 as if the user were looking at the right sides of the windows, such as right side 20*c* of window 20. In the left side view of FIG. 7, the computer 10 displays the windows 20-23 on the display device 15 as if the user were looking at the left sides of the windows, such as left side 20*d* of window 20. In the bottom view of FIG. 8, the computer 10 displays the windows 20-23 on the display device 15 as if the user were looking up at the bottoms of the windows, such as bottom 20*b* of window 20.

System Operation

Figure 9:
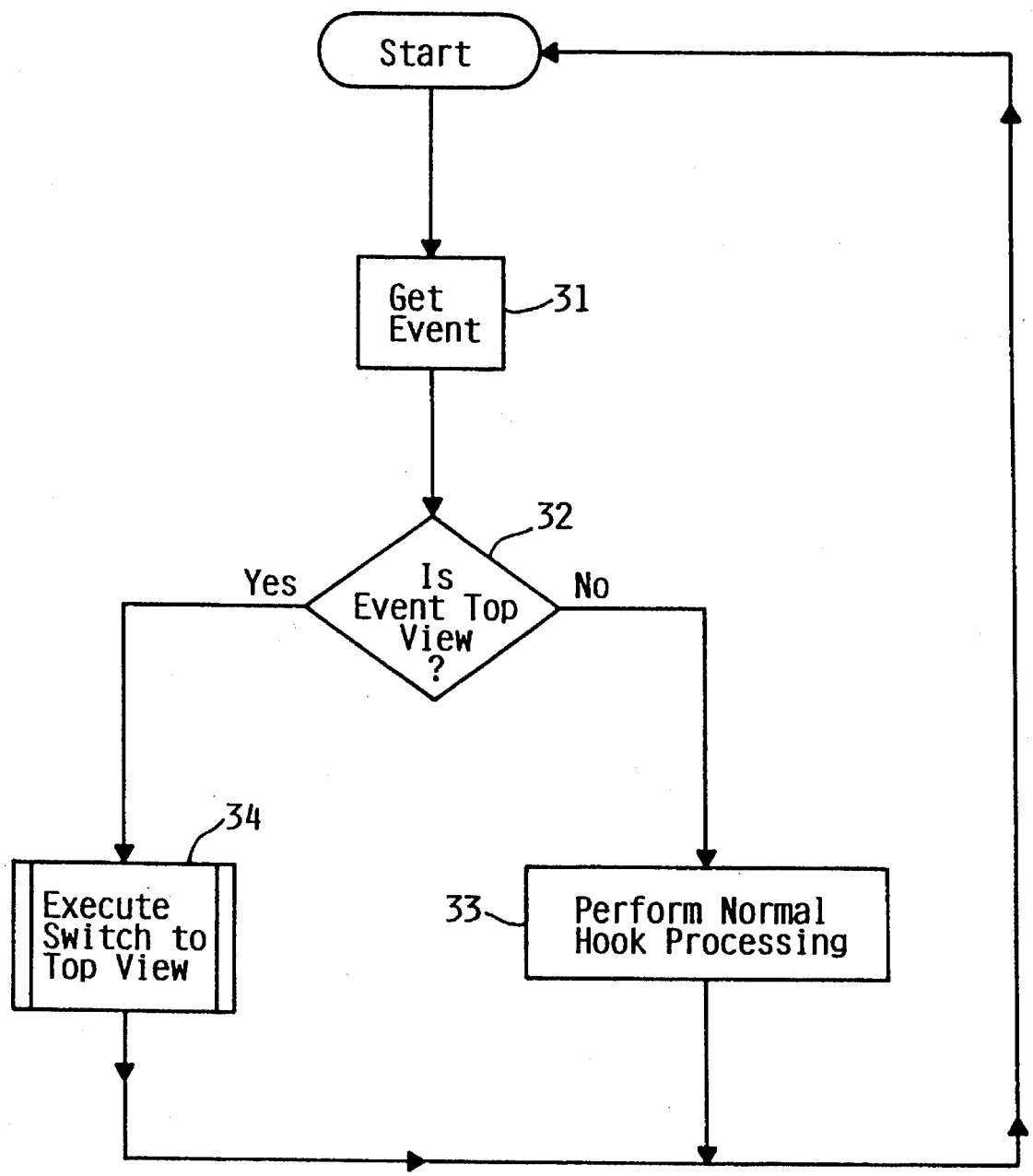
FIG. 9 is a flow chart of a preferred main window hook routine.

A preferred embodiment performs processing to display and manipulate windows in a top view. FIG. 9 is a flow chart of a preferred main window hook routine. The system retrieves an event at step 31 and determines at step 32 if the event is a request to display the windows in a top view. If it is such a request, the system executes a switch to display the windows in the top view at step 34. Otherwise, the system performs normal window hook processing at step 33.

Figure 10:
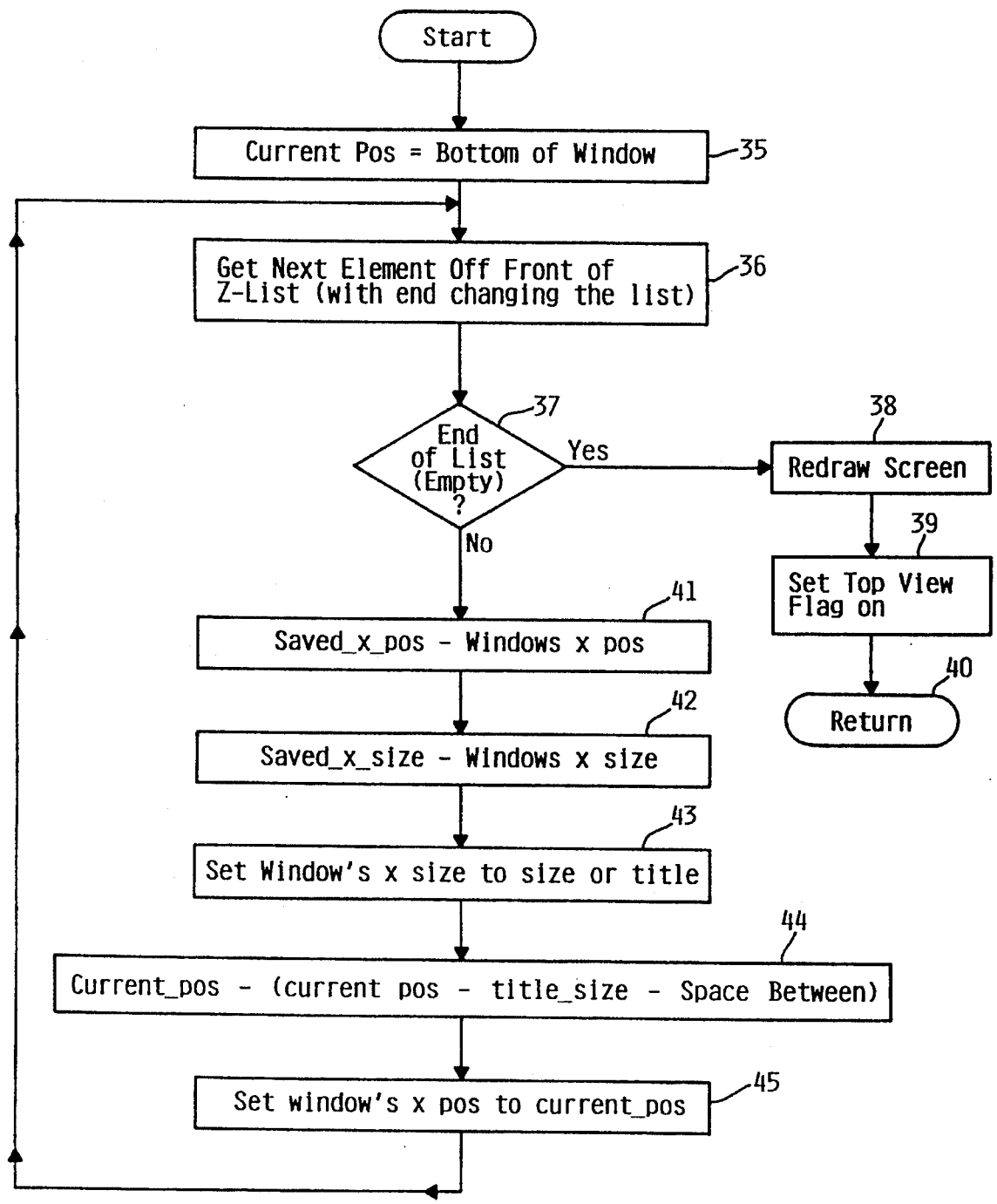
FIG. 10 is a flow chart of a preferred switch to top view routine.

FIG. 10 is a flow chart of a preferred routine for the switch to top view (step 34). The system sets the current position to the bottom of window at step 35 and then begins the process of retrieving elements from the Z list at step 36. If the element is the end of the list (step 37), then the system has retrieved all elements for the windows and proceeds to redraw the screen in the top view (step 38), turns on the top view flag 13*a* at (step 39), and returns (step 40). If the list was not empty, the system at steps 40 and 41 stores the position and size information of the corresponding window in the normal view. The system determines the size of the window for the top view (step 43), which typically comprises the title of the window. The system also determines a position for the window in the top view (step 44) and sets the windows x-position to the current position (step 45).

Figure 11:
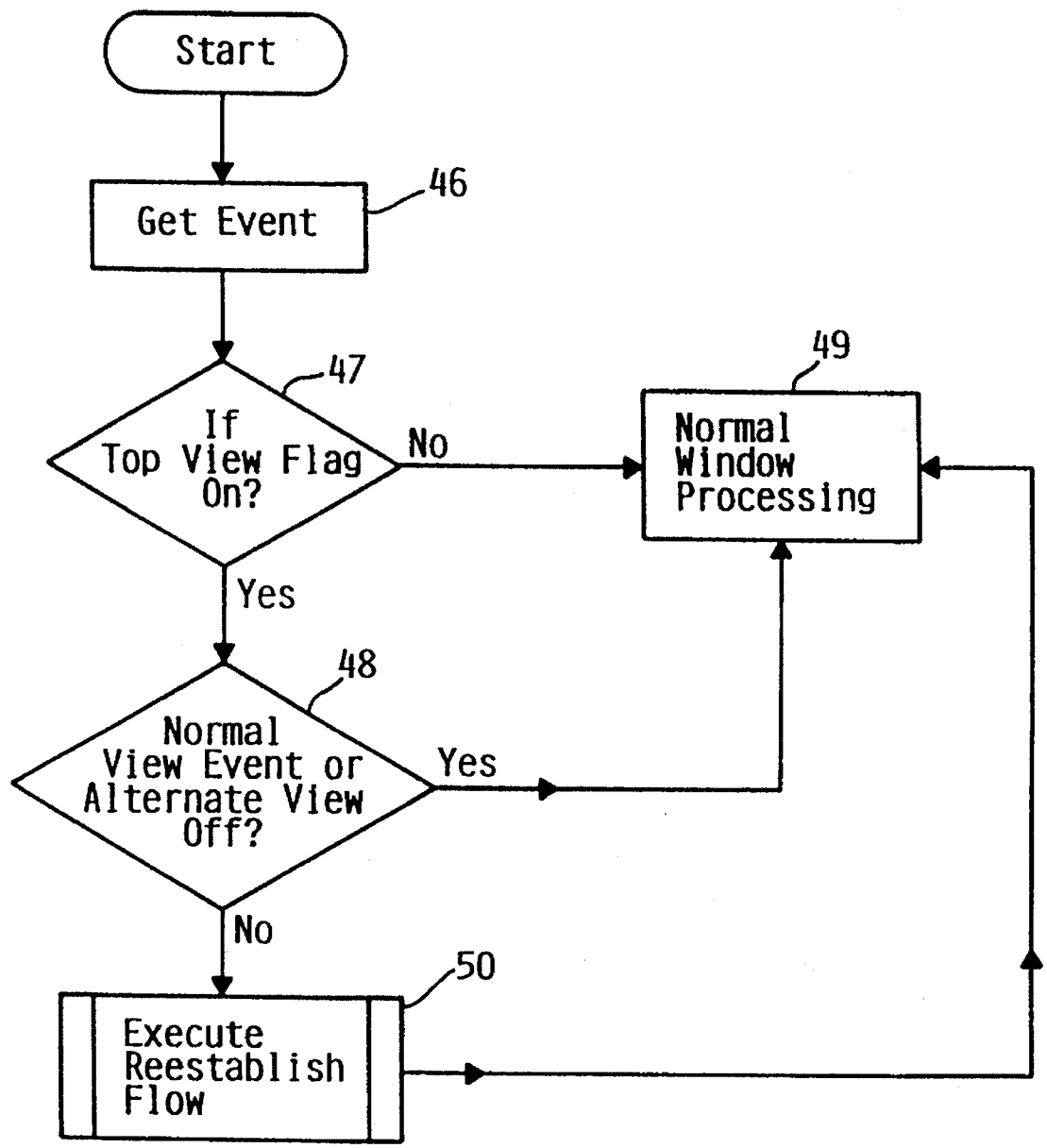
FIG. 11 is a flow chart of a preferred main window processing routine.

FIG. 11 is a flow chart of a preferred main window processing routine. The system retrieves an event at step 46 and determines if the top view flag 13*a* is on (step 47). If the event is a normal view events or request for the alternate view to be turned off (step 48), the system performs normal window processing (step 49). Otherwise, the system executes a re-establish flow procedure (step 50).

Figure 12:
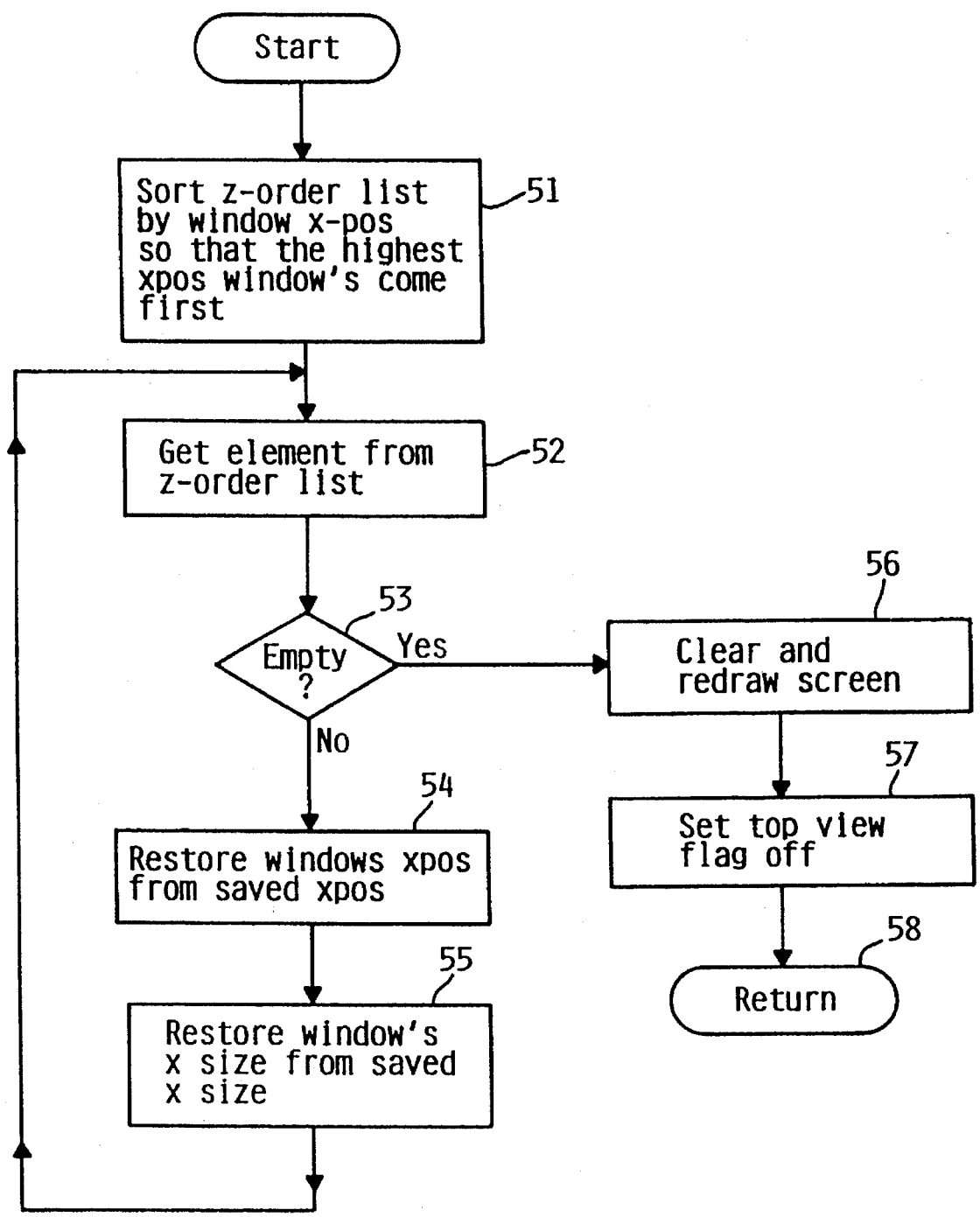
FIG. 12 is a flow chart of a preferred routine for re-establishing windows in a normal view.

FIG. 12 is a flow chart of a preferred process for re-establishing the normal view of the windows upon selection by a user. The system first sorts the z-order list (step 51) in order to present the windows in the normal view in the proper order. The system retrieves the elements from the z-order list (step 52), and if the list is not empty as determined at step 53, the system restores the window's position and size information at steps 54 and 55. When the list is empty, the system then redraws the screen presenting the windows in normal view (step 56), turns off the top view flag 13*a* (step 57), and returns (step 58).

Alternate Embodiment

In addition to displaying only a particular view, for example, a top view, the system may also be configured to display a plurality of alternate views upon selection by a user. These alternate views could be a top view, right side view, left side view, and bottom view (see FIGS. 3, 6, 7, and 8), or a subset of these views. In this embodiment, a user may select any one of the available alternate views. For example, a pull-down menu may be available which lists alternate views for selection by a user.

One skilled in the art will recognize how the flow charts (FIGS. 9–12) can be modified to generate side or bottom views. In particular, the system typically includes the following processing for the alternate embodiment in addition to the processing described above. At step 32 in FIG. 9 the system determines if the event is a request for an alternate view and which particular alternate view was selected. At step 34, the system executes a switch to the selected view.

In FIG. 10, the system sets the current position at step 35 depending on which view was selected. In particular, the system sets the current position to: the right side of view for the left view; left side of view for the right view; or the top of window for the bottom view. At steps 41–45, the system saves the window positions, manipulating the x-positions for the top and bottom view, and the y-positions for the right and left side views. At step 45, the system changes the current position for the alternate views as follows: for the left view, current_pos=(current_pos—title _size—space between); and for the right and bottom views, current_pos=(current_pos+ title_size+ space between). At step 38, the system redraws the screen for the particular selected view and then sets the corresponding flag 13a–13d (step 39) for that view.

In FIG. 11, the system determines at step 47 if any of the flags 13a-13d is set for a particular alternate view (top, right side, left side, or bottom). In FIG. 12, the system sorts the z-order list at step 51 according to the presented view. For the bottom view, the system sorts the list so that the lowest x-position is first. For the right left view, the system sorts the list so that the lowest y-position is first. For the left side view, the system sorts the list so that the highest y-position is first. At steps 54 and 55, the system restores position and size of the windows from the saved x-position and x-size for the top and bottom views, and from the saved y-position and y-size for the right and left side views. At step 57, the system sets off the flag 13a–13d for the particular alternate view.

While the present invention has been described in connection with the preferred embodiment thereof, it will be understood that many modifications will be readily apparent to those skilled in the art, and this application is intended to cover any adaptations or variations thereof. It is manifestly intended that this invention be limited only by the claims and equivalents thereof.

What is claimed is:

1. A computer-based system for presenting an alternate view of computer windows on a display device, comprising:

a display device for presenting computer windows which represent programs operating on a computer, each of the computer windows having a plurality of edges;

a memory for storing position and size information of the computer windows;

an input device for receiving commands from a user relating to presentation and manipulation of the computer windows; and a processor coupled to the memory, the display device, and the input device, the processor comprising:
   means for receiving from the input device a command to present an alternate view of the computer windows;

display means for presenting on the display device the alternate view of the computer windows upon receiving the command from the input device, the alternate view comprising a plurality of indicators representing corresponding edges of the computer windows displayed in relative position as if the user were looking at the corresponding edges of the computer windows; and means for allowing the user to manipulate the indicators using the input device and for altering a position of the computer windows as determined by the user's manipulation of the computer windows.

2. A computerized system for presenting an alternate view of computer windows on a display device, comprising:

means for presenting on a display device computer windows which represent programs operating on a computer, each of the computer windows having a plurality of edges;

display means for presenting on the display device an alternate view of the computer windows upon selection by a user, the alternate view comprising a plurality of indicators representing corresponding edges of the computer windows displayed in relative position as if the user were looking at the corresponding edges of the computer windows; and means for allowing the user to manipulate the indicators and for altering a position of the computer windows as determined by the user's manipulation of the computer windows.

3. The system of claim 2 wherein the display means comprises means for presenting the plurality of indicators in another computer window on the display device.

4. The system of claim 2 wherein each of the indicators comprises a title of the corresponding computer window.

5. The system of claim 2 wherein the display means comprises means for providing an indication among the plurality of indicators of which of the computer windows is currently active.

6. The system of claim 2, further comprising means for storing position and size information for each of the computer windows.

7. The system of claim 6 wherein the means for allowing the user to manipulate the indicators comprises means for altering the stored position information as determined by the user's manipulation of the indicators.

8. The system of claim 6, further comprising means for restoring the computer windows on the display device from the stored position and size information.

9. The system of claim 2, further comprising means for setting a flag to indicate if the display means is presenting the alternate view of the computer windows.

10. The system of claim 2 wherein the display means comprises means for presenting on the display device a top view of the computer windows upon selection by a user, the top view comprising the plurality of indicators representing the computer windows displayed in relative position as if the user were looking down at top edges of the computer windows.

11. The system of claim 2 wherein the display means comprises means for presenting on the display device a bottom view of the computer windows upon selection by a user, the bottom view comprising the plurality of indicators representing the computer windows displayed in relative position as if the user were looking up at bottom edges of the computer windows.

12. The system of claim 2 wherein the display means comprises means for presenting on the display device a side view of the computer windows upon selection by a user, the side view comprising the plurality of indicators representing the computer windows displayed in relative position as if the user were viewing right or left side edges of the computer windows.

13. A computerized method of presenting an alternate view of computer windows on a display device, comprising the steps of:

presenting on a display device computer windows which represent programs operating on a computer, each of the computer windows having a plurality of edges;

presenting on the display device an alternate view of the computer windows upon selection by a user, the alternate view comprising a plurality of indicators representing corresponding edges of the computer windows displayed in relative position as if the user were looking at the corresponding edges of the computer windows; and allowing the user to manipulate the indicators and altering a position of the computer windows as determined by the user's manipulation of the computer windows.

14. The method of claim 13 wherein the step of presenting on the display device an alternate view of the computer windows comprises the step of presenting the plurality of indicators in another computer window on the display device.

15. The method of claim 13 wherein each of the indicators comprises a title of the corresponding computer window.

16. The method of claim 13 wherein the step of presenting on the display device an alternate view of the computer windows comprises the step of providing an indication among the plurality of indicators of which of the computer windows is currently active.

17. The method of claim 13, further comprising the step of storing position and size information for each of the computer windows.

18. The method of claim 17 wherein the step of allowing the user to manipulate the indicators comprises the step of altering the stored position information as determined by the user's manipulation of the indicators.

19. The method of claim 17, further comprising the step of restoring the computer windows on the display device from the stored position and size information.

20. The method of claim 13, further comprising the step of setting a flag to indicate if the alternate view of the computer windows is being presented on the display device.

21. The method of claim 13 wherein the step of presenting on the display device an alternate view of the computer windows comprises the step of presenting on the display device a top view of the computer windows upon selection by a user, the top view comprising the plurality of indicators representing the computer windows displayed in relative position as if the user were looking down at top edges of the computer windows.

22. The method of claim 13 wherein the step of presenting on the display device an alternate view of the computer windows comprises the step of presenting on the display device a bottom view of the computer windows upon selection by a user, the bottom view comprising the plurality of indicators representing the computer windows displayed in relative position as if the user were looking up at bottom edges of the computer windows.

23. The method of claim 13 wherein the step of presenting on the display device an alternate view of the computer windows comprises the step of presenting on the display device a side view of the computer windows upon selection by a user, the side view comprising the plurality of indicators representing the computer windows displayed in relative position as if the user were viewing right or left side edges of the computer windows.

* * * * *